United States Patent [19]

DiFalco

[11] Patent Number: 5,080,220
[45] Date of Patent: Jan. 14, 1992

[54] ACCUMULATING PALLET CONVEYOR

[75] Inventor: Benjamin P. DiFalco, Overland Park, Kans.

[73] Assignee: Mid-West Conveyor Company, Inc., Kansas City, Kans.

[21] Appl. No.: 602,728

[22] Filed: Oct. 24, 1990

[51] Int. Cl.[5] ............................................. B65G 13/12
[52] U.S. Cl. .................................. 198/782; 198/465.2; 104/163
[58] Field of Search .................. 198/465.1, 465.2, 782, 198/784, 790; 193/35 SS; 104/163, 168

[56] References Cited

U.S. PATENT DOCUMENTS

| | | | |
|---|---|---|---|
| 3,530,800 | 9/1970 | Watkins | 104/168 |
| 3,818,837 | 6/1974 | Jacoby et al. | 104/166 |
| 3,842,752 | 10/1974 | Harwick | 104/166 |
| 3,983,988 | 10/1976 | Maxted et al. | 198/365 |
| 4,312,435 | 2/1982 | Bradbury | 198/782 X |
| 4,357,875 | 11/1982 | Scheel | 198/465.2 X |
| 4,367,683 | 1/1983 | Tokunaga | 104/166 |
| 4,487,132 | 12/1984 | Fuchs et al. | 104/166 |
| 4,498,397 | 2/1985 | Fuchs et al. | 104/35 |
| 4,589,542 | 5/1986 | Steadman | 198/782 |
| 4,598,815 | 7/1986 | Adama | 198/372 |
| 4,696,386 | 9/1987 | Lem | 198/782 X |

FOREIGN PATENT DOCUMENTS

| | | | |
|---|---|---|---|
| 0382017 | 8/1990 | European Pat. Off. | 193/35 SS |
| 2335874 | 1/1975 | Fed. Rep. of Germany | 198/782 |
| 1540993 | 2/1979 | United Kingdom | 104/163 |

Primary Examiner—Robert P. Olszewski
Assistant Examiner—James R. Bidwell
Attorney, Agent, or Firm—Litman, McMahon & Brown

[57] ABSTRACT

A live roller pallet conveyor utilizes a plurality of drive assemblies spaced in aligned relation along the conveyor frame and which project upwardly into the plane containing the lower drive surface of the pallet. The drive assemblies have drive rollers which contact the pallet and are controlled in both drive direction and elevation. When driving the pallet, the drive assemblies carry substantially the entire weight thereof, except for that amount which is carried by spaced rollers along one edge of the conveyor frame. The arrangement permits the pallet to be driven virtually at the peripheral speed of the drive rollers, when driving longitudinallly of the conveyor, as well as permitting a controlled speed variation with fine accelerating or decelerating effects as the drive rollers are angled in drive direction. In one form, the pallet has an elongated free spinning roller on its under side which contacts the drive rollers for producing pallet motion.

8 Claims, 3 Drawing Sheets

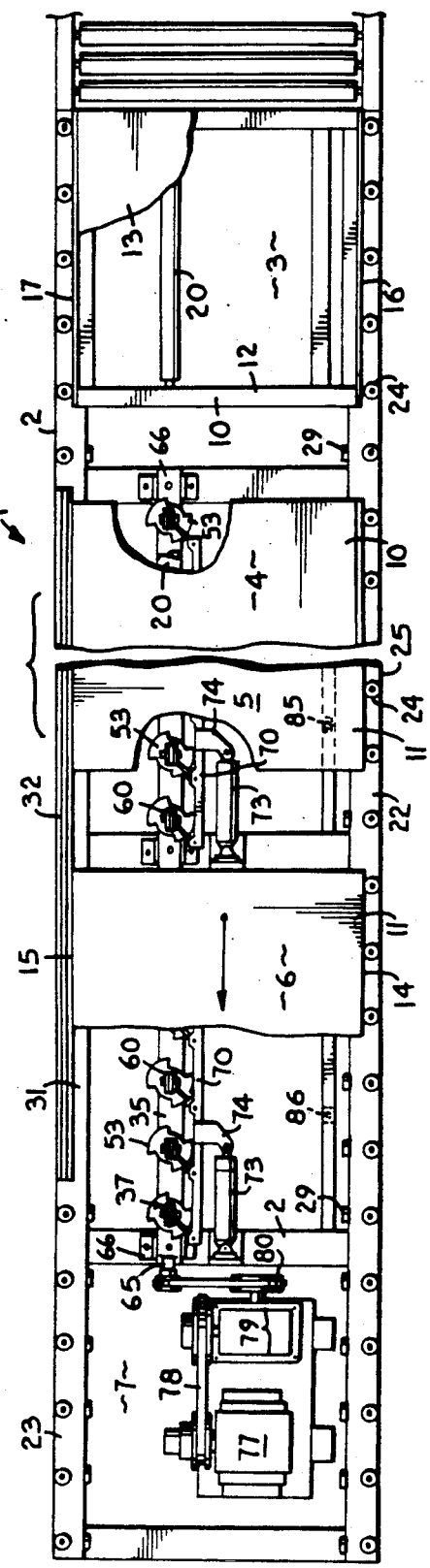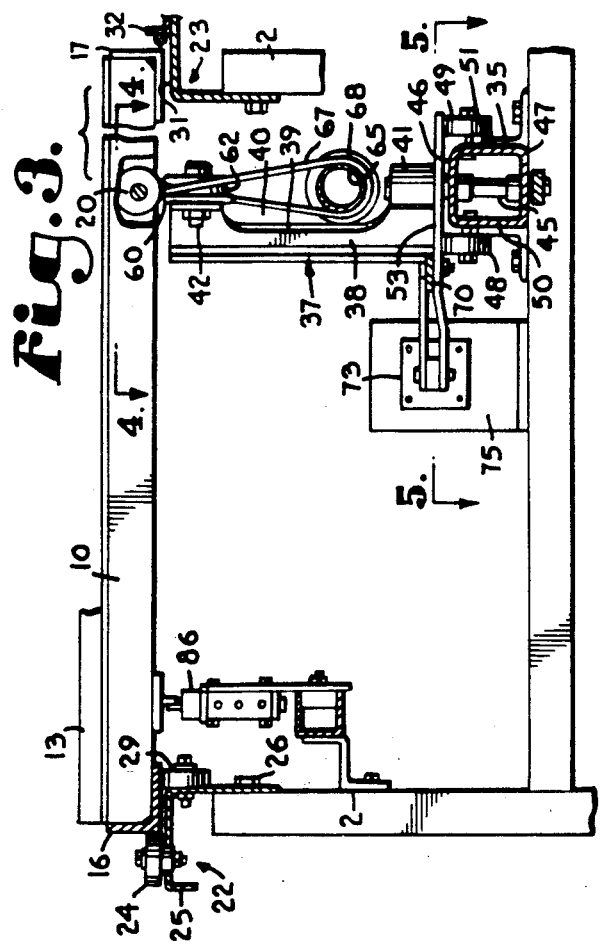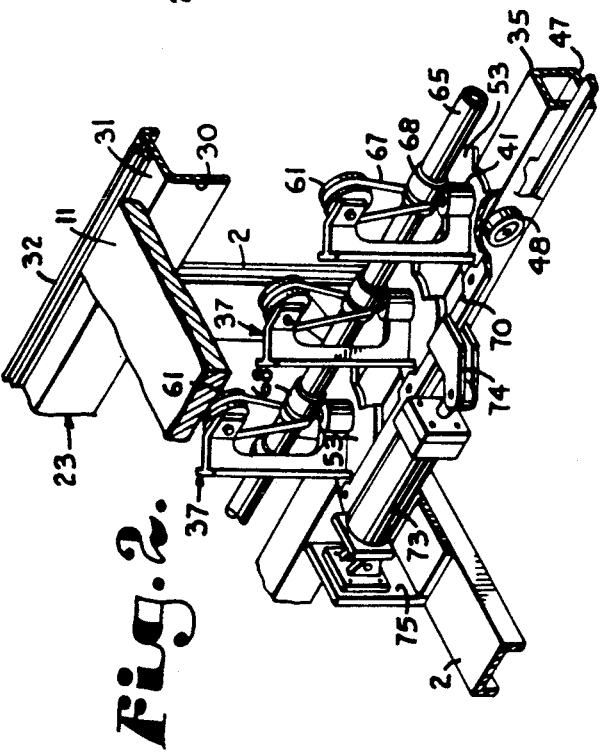

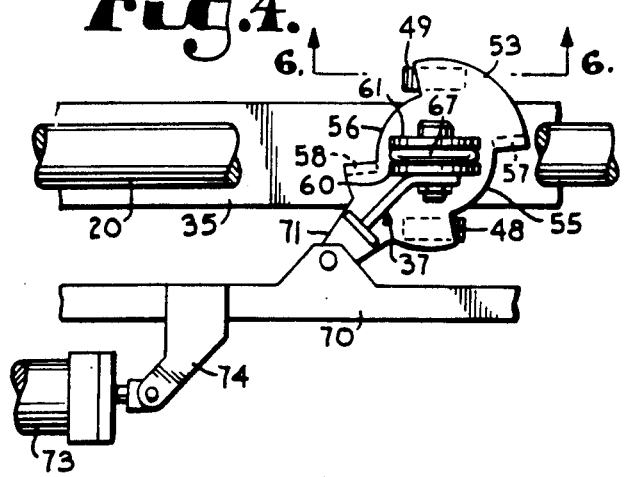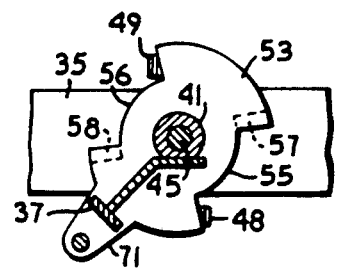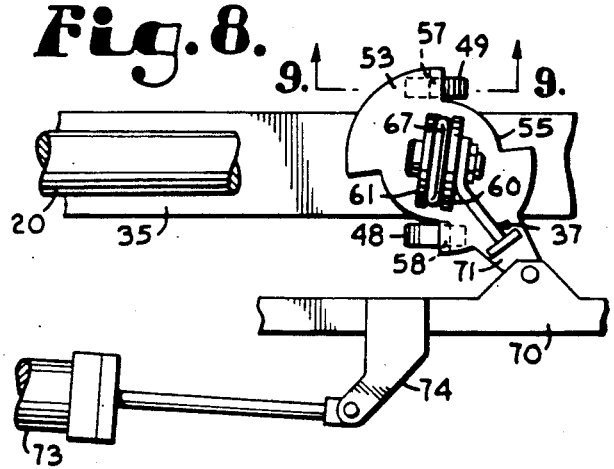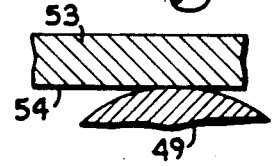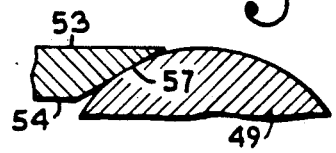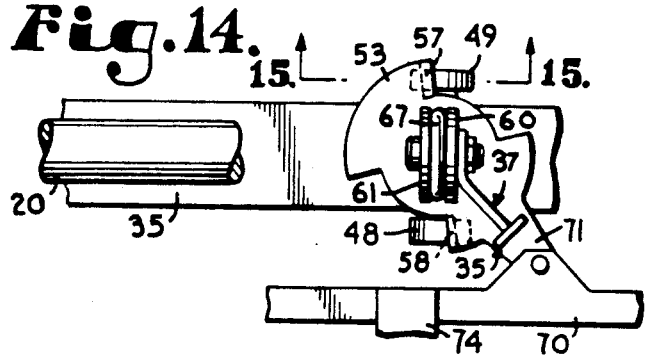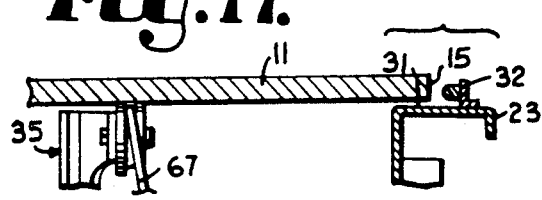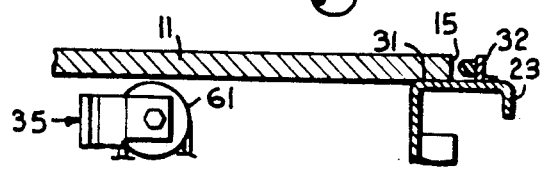

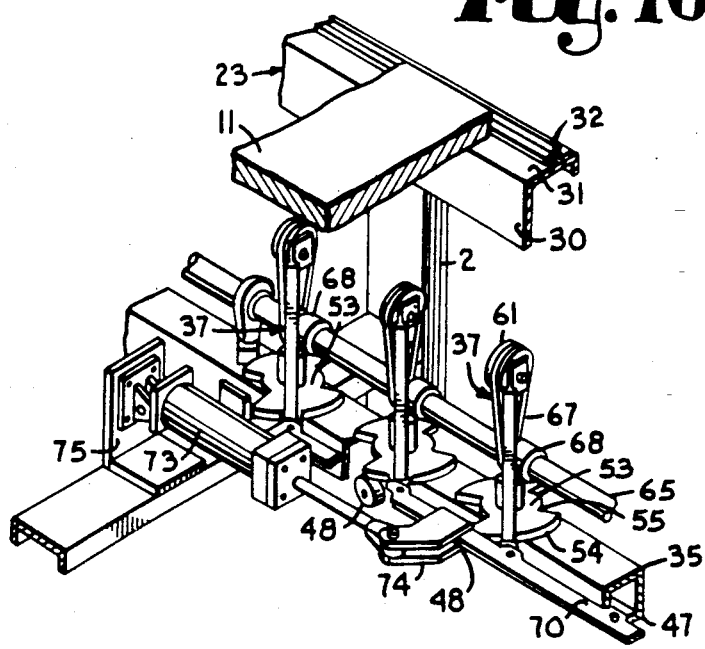
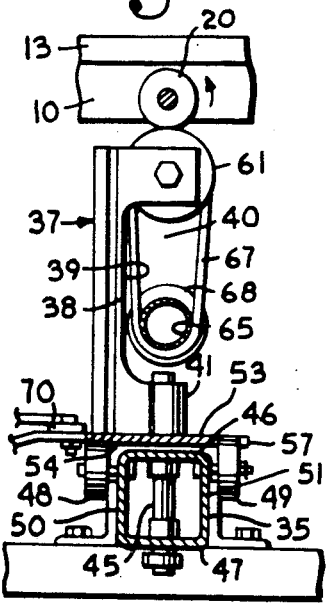
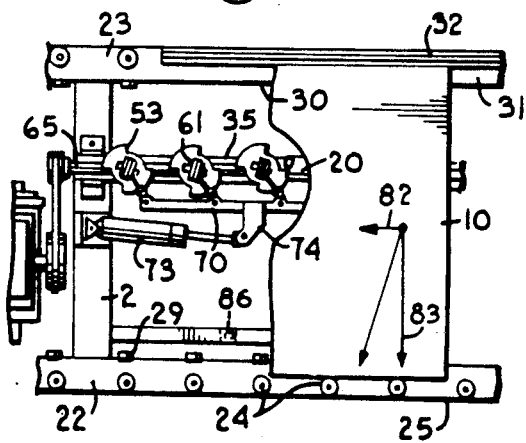
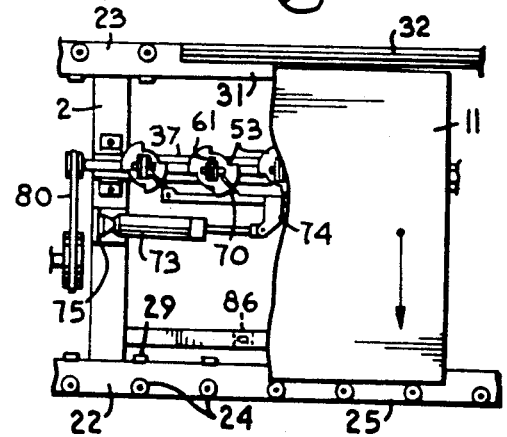
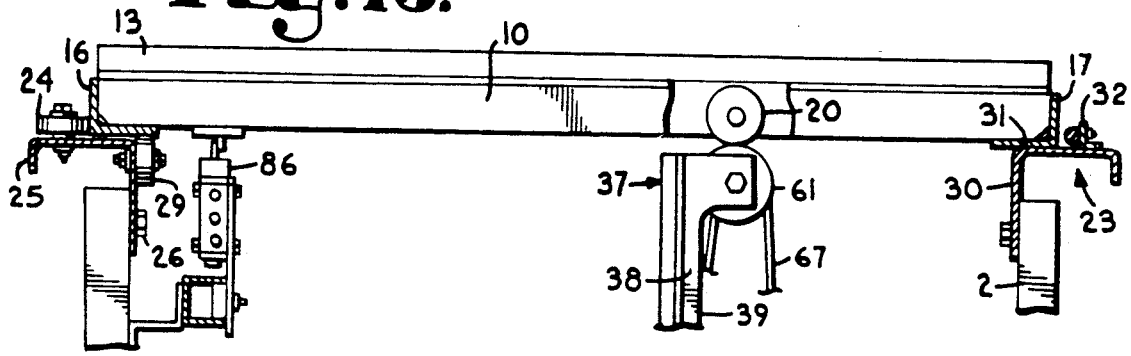

ACCUMULATING PALLET CONVEYOR

BACKGROUND OF THE INVENTION

1. Field of the Invention

The present invention relates generally to conveyors and, in particular, to live roller conveyors especially useful for moving high center of gravity pallet loads.

2. Description of the Prior Art

Live roller conveyors, including zero pressure accumulation conveyors, are well-known and have been extensively employed. Such conveyors, however, have generally been complicated, expensive, difficult to control and maintain, unreliable and/or highly sensitive to adverse environmental conditions involving dust, paint particles, oil drippings and the like. Further, prior art live roller conveyors have often been noisy and inefficient due to high power requirements from substantial friction losses.

SUMMARY OF THE INVENTION

In the practice of the present invention, a live roller pallet conveyor is provided which overcomes many of the prior art problems associated with such apparatus. The conveyor is of relatively simple and inexpensive construction and yet offers control features and flexibility thought to be heretofore unknown in such devices. These advantages are obtained through the use of a plurality of drive assemblies having upwardly projecting drive rollers and a support arrangement therefor which allows angular steering in drive direction. In a preferred form the support arrangement also allows vertical reciprocation of the drive rollers in and out of contact with the pallet.

OBJECTS AND ADVANTAGES OF THE INVENTION

The principal objects of the present invention include providing a live roller pallet conveyor which overcomes many of the disadvantages of prior art roller conveyors; to provide such a conveyor which is less expensive and of simpler construction; to provide such a conveyor system which is quieter and less sensitive to adverse environmental conditions; to provide a conveyor arrangement which offers fine control, permitting safe transport of unstable, high center of gravity palletized loads; to provide such an arrangement which offers firm stationary support for the load at work stations; and to provide such an arrangement which is easily maintained, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, plan view of a live roller pallet conveyor embodying this invention with portions broken away to illustrate two types of pallets which may be utilized thereon and the underlying drive structure therefor.

FIG. 2 is a fragmentary, perspective view on a larger scale, showing a plurality of drive assemblies spaced along the conveyor frame.

FIG. 3 is a fragmentary, cross-sectional view, on a still larger scale, through the conveyor showing a drive roller in axial driving contact with a pallet roller.

FIG. 4 is a fragmentary plan view on a still larger scale taken on the line 4—4, FIG. 3.

FIG. 5 is a fragmentary, cross-sectional plan view taken on the line 5—5, FIG. 3, particularly showing a typical cam plate.

FIG. 6 is a fragmentary, view taken on the line 6-6, FIG. 4, showing, on a still larger scale, a cam roller in peripheral contact with the under surface of a cam plate.

FIG. 7 is a fragmentary plan view showing drive rollers slightly angled away from pallet stationary, or idle, condition, as in a gentle start-up.

FIG. 8 is a fragmentary plan view of a cam plate in the transitional condition shown in FIG. 7, wherein the drive roller is rotating, pivoting and changing elevation.

FIG. 9 is a fragmentary view taken on the line 9—9 of FIG. 8 showing the cam plate in a transitional position with respect to a cam roller.

FIG. 10 is a fragmentary perspective view, similar to FIG. 2, but showing the drive rollers rotated to a pallet stationary (idle) condition.

FIG. 11 is a fragmentary, cross-sectional view on an enlarged scale showing the cam plate in drive roller idle position, allowing the drive roller to substantially lose contact with the pallet roller.

FIG. 12 is a fragmentary plan view showing the cam plates and drive rollers in idle position, with the pallet resting on a supporting shelf.

FIG. 13 is a fragmentary cross-sectional view showing the pallet in rest (idle) position with the drive roller out of contact with the pallet roller.

FIG. 14 is a fragmentary plan view showing, in more detail, the drive roller in rest (idle) position.

FIG. 15 is a fragmentary view taken on the line 15—15 of FIG. 14 showing the roller and cam plate in rest (idle) position.

FIG. 16 is a fragmentary elevational view showing the use of a simple slip pallet in rest (idle) condition.

FIG. 17 is a view similar to FIG. 16 but showing the slip pallet in full drive condition.

DETAILED DESCRIPTION OF THE PREFERRED EMBODIMENTS

1. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and are not intended to be limiting. For example, words such as "upper", "lower", "lateral" and "side" will refer to directions in the drawing to which reference is made.

The words "inwardly" and "outwardly" will refer to directions toward and away from, respectively, the geometric center of the structure and designated parts thereof. Said terminology will include the words specifically mentioned, derivatives thereof, and words of similar import.

Referring to the drawings in more detail, the reference numeral 1 generally designates a live roller pallet conveyor arrangement embodying the present invention. The conveyor 1 includes an elongated frame 2 having spaced therealong multiple stations 3, 4, 5, 6 and 7 at which certain procedures take place, including, for example, at station 6, work upon articles (not shown) which are resting upon pallets described below.

In illustrating this invention, two types of pallets are shown; a roller pallet 10 and a simple or slip pallet 11 which, for example, may consist of a rectangular plywood board 36 inches by 36 inches by one inch thick.

The roller pallet 10 is characterized, in this example, by a structural metal frame 12 comprised of welded angles and reinforcing straps which may take several forms and which may provide a base for a wood cover 13, or other arrangement, depending upon the type of article (not shown) to be carried thereon. Both the roller pallet 10 and slip pallet 11 are characterized by having parallel side edges located a predetermined distance apart. Thus, in the case of the slip pallet 11, side edges 14 and 15 are a predetermined distance apart and extend parallel to each other in order to function well in the conveyor, described below. In the case of the roller pallet 10, side edges 16 and 17 are parallel to each other and spaced apart substantially the same distance as the slip pallet edges 14 and 15.

A characteristic feature of the roller pallet 10 is an elongated roller 20 which is mounted for free rotation with respect to the frame 12 and extends longitudinally of the conveyor frame 2 when the roller pallet is resting on the conveyor, FIG. 1.

The conveyor frame 2, in this example, has spaced apart, parallel, upper, lateral edge areas or edges 22 and 23. The edges 22 and 23 are located at approximately the same elevation, as shown in FIGS. 3 and 13. A plurality of vertical axis rollers 24 are spaced apart longitudinally of the conveyor frame 2 and mounted on the frame 2, along the edge 22, utilizing an elongated channel 25 secured by appropriate fasteners 26. The vertical axis rollers 24, in this example, are substantially equally spaced apart and in linearly aligned relationship as is best seen in FIG. 1.

A plurality of horizontal axis rollers 29 are also mounted on the channel 25 and, in this example, are similarly spaced apart along the frame lateral edge 22. The horizontal axis rollers 29 are, however, spaced below and inwardly of the vertical axis rollers 24, as is best seen in FIG. 3, whereby the side edges 14 and 16 of the respective pallets 10 and 11 are movably supported both vertically and against lateral movement over and outwardly beyond the frame first lateral edge 22.

The frame second lateral edge 23 utilizes a channel 30, similar to the channel 25, but generally constituting a mirror image thereof. However, in the sections 4, 5 and 6, the illustrated sections which have driving capability, there is no counterpart to the horizontal axes rollers 29, rather, the horizontal surface 31 becomes a shelf for vertically supporting the side edges 17 and 15 of the respective pallets 10 and 11. A retaining member 32 extends along the frame lateral edge 23 and projects upwardly from the horizontal surface 31. The retaining member 32 is adapted to guide or restrict pallets moving on the conveyor against drifting over and beyond the lateral edge 23. The retaining member 32 may be constructed of any suitable low friction material, so as not to produce appreciable undesirable drag on the pallet when the member 32 is contacted thereby.

An elongated structural tube 35, in this example of rectangular cross-section, FIGS. 2 and 3, is secured on the frame 2 and extends longitudinally thereof at a level below and between the frame lateral edges 22 and 23. The tube 35 extends, in this example, within and along driving stations 4, 5 and 6.

A plurality of drive assemblies, generally indicated 37, are spaced in aligned, relationship along the tube 35 and project upwardly therefrom, FIG. 3. The drive assemblies 37 respectively comprise a vertically oriented "C" member 38, so-called because of the "C" shaped profile 39 which defines a substantial lateral opening 40. The "C" member 38 includes a lower, vertical axis hub 41 and supports an upper horizontal axis shaft 42. A vertically oriented shaft 45 is mounted on and extends through upper and lower horizontal walls 46 and 47 of the tube 35 and into the "C" member hub 41. The shaft 45 supports the "C" member 38 in the above noted vertical orientation, but permits rotation of the "C" member about the vertical axis of the shaft 45, and further permits vertical reciprocal movement therealong.

A pair of cam rollers 48 and 49 are mounted on a common horizontal axis, in this example, on opposite vertical side walls 50 and 51 of the tube 35. The horizontal axis about which the cam rollers 48 and 49 rotate preferably intersects the axis of the vertical shaft 45. The support surface, or periphery, of the cam rollers 48 and 49 extend above the upper horizontal wall 46 of the tube 35 and are positioned to support thereon a horizontal cam plate 53 which is fixed to the hub 41 of the "C" member 38. The cam plate 53 has a lower cam face 54 which is normally in contact with the cam rollers 48 and 49, whereby the cam plate and aligned rollers vertically support the "C" member 38 in a "cammed up" position. The cam plate 53 has opposed cut-out portions 55 and 56 positioned and sized to receive thereinto a portion of the respective cam rollers 48 and 49 upon rotation of the cam plate about the vertical axis of the shaft 45, thereby resulting in the lowering of the "C" member from the noted "cammed up" position to a lower or "cammed down" position. The foregoing is best illustrated in FIGS. 4 and 14, FIG. 4 showing the cam rollers 48 and 49 supporting the cam plate 53 in an up position and FIG. 14 showing the cam plate rotated approximately 90 degrees where the cam rollers 48 and 49 partially enter the cut-out portions 55 and 56, allowing the cam plate 53 to descend to a down position, and carry with it the "C" member 38.

The cam plate 53 has cam ramps 57 and 58 extending from the cam face 54 at an angle upwardly, to provide a convenient contact surface for the respective cam rollers 48 and 49 to controllably produce a smooth lowering of the cam plate 53 as it is rotated approximately the last 10 to 15 degrees from the position shown in FIG. 4 to the position shown in FIG. 14. Reference is made to the fragmentary views of FIGS. 6, 9 and 15 showing the cam face 54 and ramp 57 interacting with the cam roller 49 to modify the elevation of the cam 53.

A drive roller 60, preferably of a tough plastic resin material, is rotatably mounted on the upper horizontal axis shaft 42 and has a drive periphery 61 projecting above the "C" member 38. A belt-receiving peripheral groove 62 is located in the drive periphery 61 in a plane normal to the horizontal axis shaft 42. An elongated horizontal drive shaft 65 is rotatably mounted on the frame 2 by appropriate bearings 66 and extends along the respective drive assembly "C" members 38, projecting substantially through the "C" member openings 40 and, thus, between the respective hubs 41 and horizontal axis shafts 42. An extensible drive belt 67 is engaged in the peripheral groove 62 and drivingly about a collar 68 mounted on the drive shaft 65, whereby the rotation of the drive shaft urges the rotation of the respective drive rollers 60 regardless of the vertical or rotationally angular position assumed by the associated drive assemblies.

A control bar 70 extends adjacent the respective cam plates 53 and is pivotally connected respectively thereto by cam plate ears 71 for synchronously rotating the drive assemblies 37 about the respective "C" member axes over an angle of at least approximately 90 degrees, as best illustrated by the respective positions shown in FIGS. 4 and 14.

A linear piston cylinder 73 is functionally connected between the control bar 70 and conveyor frame 2 by means of respective brackets 74 and 75 for rotating the drive assemblies 37 as noted.

An appropriate prime mover, such as an electric motor 77, is connected through a drive belt 78 to a gear reducer 79, the output of which drives the shaft 65 through a belt and pulley system 80.

The succession of drive rollers 60 and cam plates 53 are positioned at such elevations and angles with respect to the elongated conveyor frame that the drive rollers 60, when their axes are normal to the frame lateral edges 22 and 23, contact the under surface of the slip pallets 11, or in the alternative, the pallet roller 20 of the roller pallet 10. The drive rollers 60 lift the respective pallet second side edge 15 or 17 off the support surface 31 (compare FIGS. 13 and 3 for the roller pallet 10 and FIGS. 16 and 17 for the slip pallet 11), whereupon the respective pallet, and the load thereon (not shown) is completely supported by the respective drive roller peripheries 61 and horizontal axis rollers 29 located at the first frame lateral edge 22.

When the drive rollers 60 are so positioned, that is, with their respective axes normal to the frame lateral edges 22 and 23, the pallets are driven along the conveyor path at substantially the peripheral speed of the drive rollers. The pallet speed under these conditions can be easily controlled by simply modifying the rotational speed of the motor 77. The pallet moves easily and relatively quietly along the conveyor with minimal friction losses and substantial smoothness, the pallets being guided on one side by the rollers 24 and on the other side by the retaining member 32.

At the full alternate position, (FIGS. 13 and 14 with respect to the roller pallet 10 and FIG. 16 with regard to the slip pallet 11), that is, with the drive rollers 60 axes extending parallel to the conveyor frame lateral edges 22 and 23, the "C" members are lowered due to the cam rollers 48 and 49 entering the cam plate cut-out portions 55 and 56. This allows the pallet to lower so that the respective pallet edge, 15 or 17, rests upon the horizontal surface 31, and the drive rollers 60 disengage from the respective pallets or maintain only slight contact therewith. Even though the drive rollers continue to rotate, this produces a stationary, stable pallet, allowing work, of even a delicate nature, to be performed on the pallet load (not shown).

Rotating the cam plate 53 back about 90 degrees in the opposite direction produces driving re-engagement of the respective pallet with the drive rollers 60 and maximum speed movement of the pallet downstream on the conveyor, however, re-engagement without full speed is obtained within approximately the first 10 to 15 degrees of back rotation of the cam.

The advantages of this invention are not fully realized by considering only the two end positions of the drive rollers. By manipulating the angle of the drive rollers further desirable effects may be produced, including fine speed control without altering motor speed, fine acceleration and deceleration control, and even pallet back-up. Such manipulation of the drive roller angle is easily provided through controlling the speed and degree of extension of the piston cylinders 73.

By way of illustration, FIGS. 7 and 8 show the drive rollers 60 only a few degrees off the axis parallel position (idle position) described above in connection with FIG. 14. By slowly moving from idle to the position shown in FIGS. 7 and 8, a slow and controlled acceleration is produced and the final speed is slow due to the small drive vector 82, the much larger vector 83 producing no motion because of retention by the rollers 24.

It is to be understood that this type of control is particularly well suited for the roller pallet 10 because the larger vector 83 will then not produce a substantial friction loss, since it will be largely dissipated by the rotation of the roller pallet roller 20. Under such conditions, the slip pallet 11 will result in relatively high friction slippage between the drive rollers 60 and slip pallet drive surface. Nevertheless, particularly with light loads, slip pallets may be utilized with efficiencies still surpassing many conventional live roller conveyors.

The control procedures noted above function as well in the opposite situation, that is, for decelerating within desired limits and maintaining a desired speed. Yet further, by moving the idle angle beyond 90 degrees, the pallet may be driven in a reverse, or back-up, direction.

Since fine control is easily obtained by simply controlling the respective piston cylinder 73, the arrangement above described is particularly well suited for moving unstable, high center of gravity loads, for example, home refrigerators, since acceleration and deceleration can be very smoothly achieved within desired limits to minimize the danger of tipping.

Accumulation of closely spaced multiple pallets on the conveyor without such pallets having to touch each other (zero pressure accumulation), is easily achieved through the use of control switches, such as 85 and 86 (FIGS. 1 and 3), which are actuated by the presence of a pallet in the station. The actuation of the switches, through suitable, well-known, conventional control circuits, causes the respective piston cylinder 73 to arrest movement of a subsequent pallet into a station as long as that station is occupied by a pallet.

In the illustrated example, only stations 4, 5 and 6 are controlled, stations 3 and 7 not being provided with drive members. However, it should be apparent that the conveyor may include any number of driven stations and may be easily integrated into other systems for handling and transporting articles.

The speed and extent of projection of the respective piston cylinders is easily and conventionally controlled through the use of appropriate bleeders, stops, position sensors, etc., all of which are conventional and easily functionally applied in connection with the conveyor apparatus.

When only light duty conveyance is needed, it is possible to utilize the above described system in absence of means to vertically raise and lower the drive rollers 60. This will, of course, result in greater wear of the drive rollers 60 and/or belts 67 which, however, may be justified in view of the lower cost of conveyor construction.

It is to be understood that while certain forms of the present invention have been illustrated and described herein, it is not to be limited to the specific form or arrangement of parts described and shown, except insofar as such limitations are included in the following claims.

What is claimed and desired to be secured by Letters Patent is:

1. A live-roller pallet conveyor for conveying a pallet having a pair of opposed side edges, said conveyor comprising:
   (a) a pallet drive assembly having a pallet drive roller,
   (b) means for supporting said pallet in driving contact with said drive roller between said side edges whereby said drive roller imparts motion to said pallet,
   (c) roller means for guiding said pallet in a restricted path, said roller means laterally and vertically supporting one of said side edges while the other of said side edges is unsupported due to said driving contact, and
   (d) means associated with said drive roller for varying the driving directions of said drive roller to directions inconsistent with said restricted path while said roller means restricts the movement of said pallet to said restricted path.

2. The conveyor of claim 1 including:
   (a) additional pallet drive assemblies aligned with said pallet drive assembly and operating in tandem therewith.

3. The conveyor of claim 1 including:
   (a) means associated with said drive assembly for selectively breaking driving contact between said pallet and drive roller.

4. In combination, a pallet conveyor for conveying a pallet having a pair of opposed side edges,
   (a) said pallet having an elongated roller mounted thereon,
   (b) said conveyor having a pallet drive assembly with a pallet drive roller,
   (c) means for supporting said pallet in a position where said drive roller contacts said pallet roller,
   (d) means for laterally and vertically supporting one of said side edges,
   (e) means for varying the drive direction of said drive roller while maintaining driving contact with said pallet roller,
   (f) and means for causing the other of said side edges to be vertically elevated,
   (g) whereby a portion of the driving force imparted by said drive roller drives said pallet with the other of said side edges vertically elevated and a portion rotates said pallet roller.

5. The combination as set forth in claim 4 including:
   (a) multiple drive assemblies each presenting a drive roller, and
   (b) a plurality of drive roller simultaneously contacting said pallet roller.

6. A live roller pallet conveyor for conveying a pallet having a pair of opposed side edges, said conveyor comprising:
   (a) an elongated conveyor frame,
   (b) means laterally and vertically supporting one of said side edges for guiding said pallet along said frame,
   (c) a plurality of drive assemblies mounted on and spaced in aligned relation along said frame and projecting upwardly,
   (d) means permitting rotation of said drive assemblies about, and vertical reciprocal movement along, a vertical axis,
   (e) cam means associated with said drive assemblies for producing said drive assembly rotation and reciprocal movement,
   (f) said drive assemblies each including a drive roller rotatably mounted thereon, means rotation said drive rollers, and
   (g) means for urging said drive rollers into driving contact with said pallet causing the other of said side edges to be vertically elevated, said cam means modifying the driving direction of said drive rollers.

7. The conveyor as set forth in claim 6 wherein:
   (a) said cam means is adapted to selectively break driving contact between said drive rollers and pallet when said drive rollers achieve a predetermined drive angle with respect to said frame.

8. A live roller pallet conveyor comprising:
   (a) an elongated conveyor frame having multiple stations therealong at which work is to be done on article pallets having first and second side edges extending parallel to said frame;
   (b) said frame having first and second spaced apart, parallel, upper, lateral edges at approximately the same elevation,
   (c) a plurality of vertical axes rollers spaced apart and mounted on said frame along said first lateral edge and in aligned relationship, a plurality of horizontal axes rollers spaced apart and mounted on said frame along said frame first lateral edge and in aligned relationship, said horizontal axes rollers being spaced below and inwardly of said vertical axes rollers whereby said pallet first side edge may be movably supported both vertically and against lateral movement over and beyond said frame first lateral edge,
   (d) said frame second lateral edge having an elongated support surface thereon adapted to selectively vertically support said pallet second side edge, retaining means extending along said frame second lateral edge and at a higher elevation than said support surface, said retaining means being adapted to prevent said pallet second side edge from movement over and beyond said frame second lateral edge,
   (e) a rectangular cross-section tube on said frame and extending longitudinally thereof at a level below and between said frame lateral edges, said tube substantially extending into at least one of said stations,
   (f) a plurality of drive assemblies spaced in aligned relation along said tube and projecting upwardly therefrom, said drive assemblies comprising vertically oriented "C" members having a lower vertical axis hub and an upper horizontal axis shaft, (g) a vertical shaft mounted on and extending through upper and lower horizontal walls of said tube and into said "C" member hub, said vertical shaft supporting said "C" member in said vertical orientation, but permitting rotation of said "C" member about, and vertical reciprocal movement along, a vertical axis, (h) a pair of aligned cam rollers mounted respectively on opposite vertical side walls of said tube for rotation about a horizontal axis intersecting with the axis of said vertical shaft, the support surface of said cam rollers extending above the upper horizontal wall of said tube, (i) a horizontal cam plate fixed to said "C" member hub and having a lower cam face normally in contact with said aligned cam rollers, whereby said cam plate and aligned rollers vertically support said "C" member spaced above the upper horizontal wall of said tube in an upper position, said cam plate having opposed cut-out portions positioned and sized to receive said cam rollers upon rotation of said cam plate, thereby resulting in the lowering of said "C" member from said upper position to a lower position, (j) a drive roller rotatably mounted on said "C" member horizontal axis shaft and having a drive periphery projecting above said "C" member and a belt receiving peripheral groove located in a plane normal to said horizontal axis shaft, (k) an elongated, horizontal drive shaft rotatably mounted on said frame and extending along and past said drive assembly "C" members and between said respective "C" member hubs and horizontal axis shafts, an extendible drive belt engaged in said respective peripheral groove and about said drive shaft whereby the rotation of said drive shaft urges the rotation of said drive roller regardless of the vertical and angular position of said drive assemblies, (l) a control bar extending along said cam plates and pivotally connected respectively thereto for synchronously rotating said drive assemblies about said respective "C" member axes over an angle of at least approximately 90 degrees, (m) a linear piston cylinder connected between said control bar and said conveyor frame for rotating said drive assemblies, and (n) drive means for rotating said drive shaft, (o) said drive rollers and cam plates being at such positions, elevations and angles with respect to said conveyor frame that said drive rollers, when their axes are normal to said lateral edges, contact the under surface of the pallet and lift the pallet second side edge off said support surface and drive the pallet along said lateral edges at substantially the peripheral speed of the drive rollers, and when the drive roller axes are parallel to said lateral edges, the pallet is substantially stationary with said pallet second side edge resting on said support surface, and in between said two positions said drive rollers tend to drive the pallet at a fraction of peripheral drive roller speed, which fraction decreases as the drive roller axes approach parallelism with said lateral edges, creating fine speed control with the ability to accelerate and decelerate at will by controlling the speed of change of said piston cylinder.

* * * * *

UNITED STATES PATENT AND TRADEMARK OFFICE
CERTIFICATE OF CORRECTION

PATENT NO. : 5,080,220

DATED : January 14, 1992

INVENTOR(S) : Benjamin P. DiFalco and Harold S. Burt

It is certified that error appears in the above-identified patent and that said Letters Patent is hereby corrected as shown below:

On the title page, item (19) after DiFalco", insert --et al.--;
Title page, item (75):
    "Inventor" should be changed to --Inventors--;

After "DiFalco, Overland Park, Kans.", insert
--and Harold S. Burt, Kansas City, Kans.--

Signed and Sealed this

Fifteenth Day of June, 1993

Attest:

MICHAEL K. KIRK

*Attesting Officer*    *Acting Commissioner of Patents and Trademarks*